US008729427B2

(12) United States Patent
Osako (10) Patent No.: US 8,729,427 B2
(45) Date of Patent: May 20, 2014

(54) MINIMIZING THERMAL EFFECT DURING MATERIAL REMOVAL USING A LASER

(75) Inventor: Yasu Osako, Lake Oswego, OR (US)

(73) Assignee: Electro Scientific Industries, Inc., Portland, OR (US)

(*) Notice: Subject to any disclaimer, the term of this patent is extended or adjusted under 35 U.S.C. 154(b) by 183 days.

(21) Appl. No.: 12/413,084

(22) Filed: Mar. 27, 2009

(65) Prior Publication Data

US 2010/0243625 A1 Sep. 30, 2010

(51) Int. Cl.
*B23K 26/00* (2006.01)

(52) U.S. Cl.
USPC ............................ 219/121.72; 219/121.76

(58) Field of Classification Search
USPC .......... 219/121.61, 121.69, 121.8, 121.81, 219/121.72, 121.67, 121.71, 121.77, 121.7, 219/121.83, 121.44, 121.64, 121.78, 219/121.74, 121.75, 121.76; 264/400, 163, 264/157, 138, 161, 162, 482, 22, 28, 1.24, 264/293; 372/22, 25, 28, 20, 13, 34, 33, 372/102, 50.1
See application file for complete search history.

(56) References Cited

U.S. PATENT DOCUMENTS

| 5,630,953 | A * | 5/1997 | Klink ........................ 219/121.69 |
| 2002/0141473 | A1 * | 10/2002 | Cordingley et al. .......... 372/106 |
| 2002/0195012 | A1 * | 12/2002 | Juffinger et al. ........... 101/401.1 |
| 2003/0006221 | A1 * | 1/2003 | Hong et al. ............... 219/121.72 |
| 2003/0121895 | A1 * | 7/2003 | Sonoda et al. ............ 219/121.63 |
| 2006/0097430 | A1 * | 5/2006 | Xiaochun et al. ............. 264/400 |
| 2007/0235431 | A1 * | 10/2007 | Yamazaki et al. ....... 219/121.85 |
| 2008/0179304 | A1 | 7/2008 | Osako et al. |
| 2008/0181269 | A1 | 7/2008 | Osako et al. |
| 2009/0046754 | A1 * | 2/2009 | Kohda ....................... 372/44.01 |

FOREIGN PATENT DOCUMENTS

| JP | 05-131286 | 5/1993 |
| JP | 07-236988 | 9/1995 |
| JP | 2000-288752 | * 10/2000 ............ B23K 26/00 |
| JP | 2000-288752 A | 10/2000 |
| JP | 2003-053928 A | 2/2003 |
| JP | 2005-161322 A | 6/2005 |
| JP | 2009-538231 A | 11/2009 |

* cited by examiner

*Primary Examiner* — Henry Yuen
*Assistant Examiner* — Phuong Nguyen
(74) *Attorney, Agent, or Firm* — Young Basile Hanlon & MacFarlane P.C.

(57) ABSTRACT

A process to cut sheet material using a laser is improved by performing a first plurality of routings using a first toolpath for the laser and performing at least a second routing using a second toolpath for the laser after performing the first plurality of routings using the first toolpath, the second toolpath traverse from a kerf formed by the laser as a result of performing the first plurality of routings. A z-height shift can be simultaneously implemented with the transverse shift. By shifting the toolpath, interference of plasma generated during laser processing is minimized by maximizing the coupling of the laser and the material, resulting in less discoloration and/ or burning of the material.

17 Claims, 5 Drawing Sheets

MINIMIZING THERMAL EFFECT DURING MATERIAL REMOVAL USING A LASER

FIELD OF THE INVENTION

This invention relates generally to minimizing thermal effect resulting from a laser used for machining to remove material from a part.

BACKGROUND

Mechanical systems such as computer numerical controlled (CNC) or diamond saw systems are the dominant tools to cut out plastic, metal sheet or inorganic plates. Sometimes a sharp corner for the cutout is required for such an application. In this case, drill bits of small diameter are required to achieve the sharp corner. Generally, process speeds are slowed down to avoid damage of such drill bits. Sometimes the material is coated with a brittle layer. In this case, the mechanical system also slows down the process speed to minimize the cracks in the brittle layer.

An alternative tool is a laser-based system that could reduce the cracking in the brittle layer and/or make the small cutout feature possible.

SUMMARY

Embodiments of the invention provide improvements in a process to cut a sheet material using a laser. One such improvement comprises, by example, performing a first plurality of routings using a first toolpath for the laser and performing at least a second routing using a second toolpath for the laser after performing the first plurality of routings using the first toolpath, the second toolpath traverse from a kerf formed by the laser as a result of performing the first plurality of routings.

Variations and details respecting this and other applications of the present invention will become apparent to those skilled in the art when the following description is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

When a portion of a thick material, such as a plastic, polymer or metal sheet is cut out by a laser, thermal effect appears as a dull edge, especially over corners or small curvatures. The dull edge reflects light differently from other areas, and the result is a thermal ring appearing along the cut kerf. When the kerf is deep enough inside a plastic sheet, the etching rate tends to saturate as discussed in additional detail hereinafter. A flame can be generated inside the kerf. The consequential melting along the kerf and the carbonization degrade process quality and the quality of the resulting product.

Where a solid state laser including a fiber laser or a gas laser is used, multiple repetitions of a single routing are usually required to cut through the thick material depending on the etching rate. Even though such a process reduces these problems over a one time routing with a large pulse energy or power, heat can still be loaded inside the material. As a result, a thermal effect such as a dull edge, or bulging or discoloring, could appear at the kerf.

Embodiments of the invention seek to minimize the thermal effect and optimize material removal through maximizing the coupling between the laser and the material being processed.

During laser ablation of a part made of a particular material, a clean process is obtained using a laser having a wavelength with high absorption and having short pulses compared with the thermal relaxation time of the material.

Figure 1:
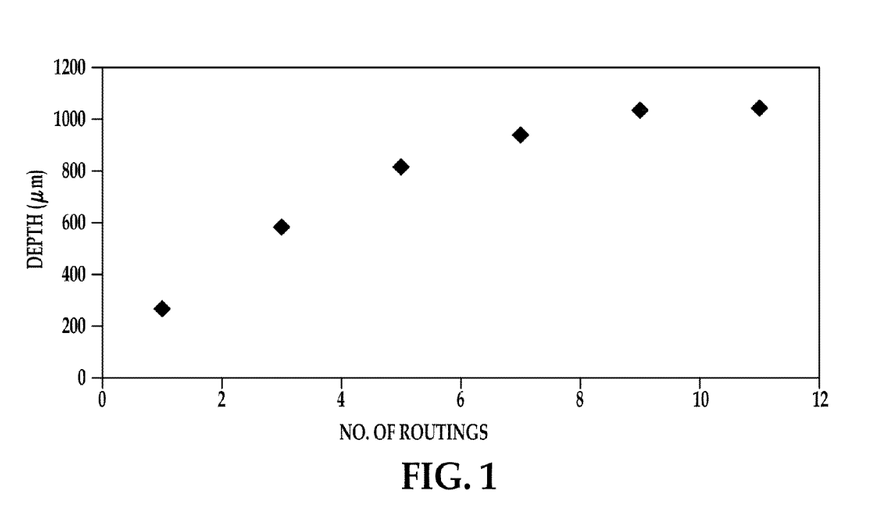
FIG. 1 is a graph showing the saturation of etching by a comparison of a number of routings to a cut depth.

When high fluence with a large pulse energy or high power is applied to the material, the plasma and/or fine particles generated by the laser ablation are trapped inside the kerf as the kerf becomes deeper. Then the interaction between the plasma and/or particles and the incident beam becomes prominent, resulting in saturation. FIG. 1 shows an example of this saturation for polycarbonates or ABS substrates about 1 mm thick with a relatively thick brittle coating thereon. As shown in FIG. 1, as the number of routings increases, the achieved depth similarly increases. This increase is roughly linear for a small number of routings. However, once the number of routings reaches a certain point, here at about 6 routings, etching begins to saturate. That is, the thermal effect interferes with the routing such that increased depth cannot be achieved.

Figure 2A:
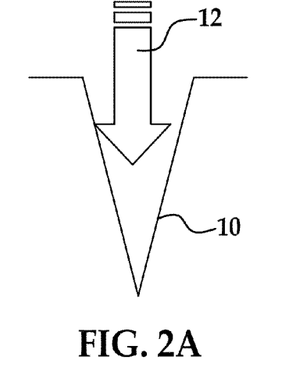
FIGS. 2A and 2B are simplified schematic views of the cross-section of a kerf during laser processing.
Figure 2B:
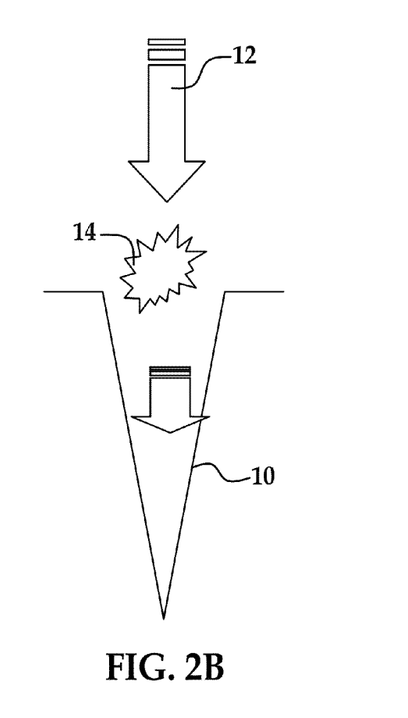

Without being bound by theory, several loss mechanisms are considered responsible, the absorption of the incident laser beam to the plasma, the scattering of the incident beam by small particles, the depth of focus and/or intensity variation. For example, after several routings, the laser intensity might be less deep in the cut than at the top surface. The absorption of the laser with the plasma is proportional to the wavelength. The scattering is inversely proportional to the 4th power of the wavelength. The interaction via absorption increases the temperature of the plasma that can heat up the nearby material. Further, the absorption of the incident beam by the plasma can lead to the reduction of the process speed and quality. This is illustrated in FIGS. 2A and 2B. FIG. 2A is a cross section of a kerf 10 after a first routing using a laser (represented by incident beam 12). During subsequent routings to increase the depth of the cut, plasma (ablated material) 14 accumulates during etching and can be trapped in the trench of kerf 10.

One possible solution is to perform a subsequent routing while changing laser parameters in the toolpath, specifically changing the z-axis (z-height) position of the laser beam and/or the workpiece as shown schematically in FIG. 2B (not to scale). By changing the z-axis position, more of the incident beam 12 can reach the kerf 10 through the plasma 14 than would otherwise occur with repeated routings using the first toolpath because the plasma 14 does not block the entire path of the incident beam 12. Additional benefits with respect to minimizing or avoiding interference with plasma 14 can be achieved by a transverse shift in the routing of the laser (e.g., an x-axis shift of the laser beam and/or the workpiece) such that one or more additional routings occur near the original routing(s) but enlarge the area where plasma 14 can be trapped so that it is more easily dispersed. Specifics of this inventive method and its process control are described in additional detail hereinafter.

Figure 3:
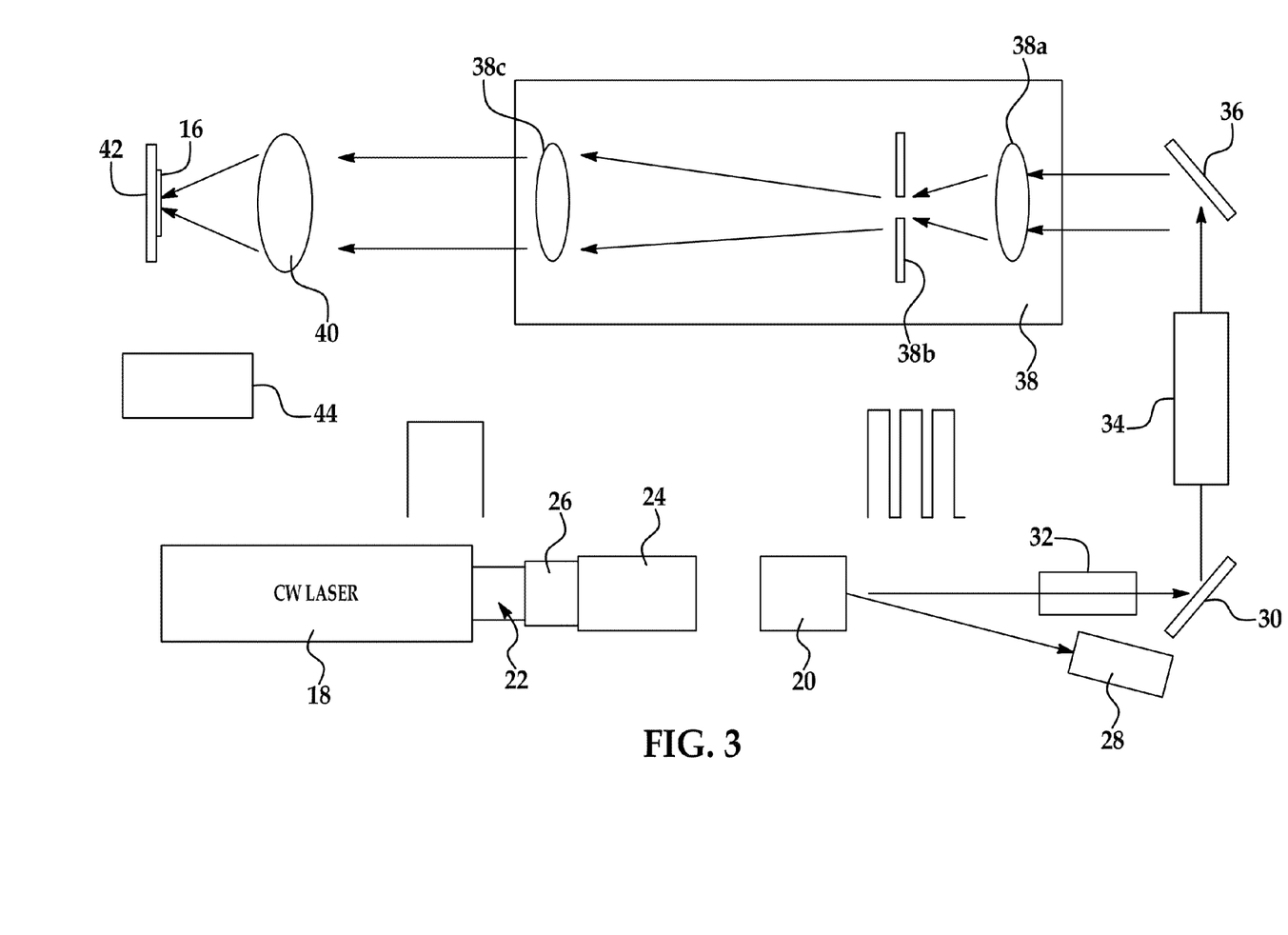
FIG. 3 is a simplified schematic of a system incorporating an embodiment of the invention.

Embodiments of the invention can be incorporated into control of a laser system such as that described in U.S. Patent Publication No. 2008/0179304 A1, published on Jul. 31, 2008, the entire content of which is incorporated herein by reference. FIG. 3 shows one example of a laser system working on a piece of sheet material 16 in which the present invention can be incorporated. In FIG. 3, a continuous-wave (CW) CO2 laser 18 and an acousto-optic modulator (AOM) 20 are configured as a sub-microsecond laser power controller/shutter. A quasi-CW CO2 laser can also be used. AOM 20 is also configured as a pulser for CW laser 18. In another embodiment, AOM 20 may be configured as a pulse picker for a pulsed laser. AOM 20 may also be configured for adjusting the pulse energy and repetition rate so that the processing can take place not only during the constant velocity periods, but also during the acceleration and deceleration periods. Optionally located between CW laser 18 and AOM 20 are an isolator 22, a Brewster window by example, and a shutter 24. If isolator 22 and shutter 24 are incorporated, a collimator 26 can optionally be located between isolator 22 and shutter 24.

Depending on a deflection angle selected by AOM 20, the laser beam is directed from AOM 20 either to a beam dump 28 or to a first mirror 30 through reflective phase retarder (RPR) 32. First mirror 30 directs the laser beam from AOM 20 through an optional zoom lens system 34 to a second mirror 36 that directs the laser beam through an aperture 38. Aperture 38 comprises a first lens 38a located in the laser beam path adjacent second mirror 36, aperture 38b adjacent to first lens 38a and a second lens 38b located on the opposite side of aperture 38b. First lens 38a can be changed to a spatially modifying element such as diffractive optics. A top hat beam can be used with such diffractive optics. Also, instead of second mirror 36, a beam splitter could be incorporated to direct a portion of the laser beam to a power monitor configured to provide laser power control to AOM 20 in addition to directing a portion of the laser beam to aperture 38. Aperture 38 directs the laser beam to a processing head located on an X, Y stage (gantry). For simplicity, the processing head and gantry are represented by a lens 40. The processing head directs the laser beam to sheet material 16 aligned on an additional stage work surface 42. Of course, and as described in U.S. Patent Publication No. 2008/0181269 A1, also published on Jul. 31, 2008, and incorporated herein in its entirety by reference, the system can incorporate additional components, such as more than one AOM 20, to distribute multiple laser beams to multiple processing heads from CW laser 18. One benefit of the sliced CW laser 18 shown and described is that it enables the aperture 38 to cool down during the inter-pulse duration and avoids excessive thermal load in the aperture 38.

Variations in this arrangement are possible as is clear from the description above, and embodiments of the invention can be incorporated into various system configurations. As additional examples, although RPR 32 is included to make sure the incident beam 12 at the surface of sheet material 16 is circularly polarized to help achieve a uniform process regardless of the process direction, such a component is not necessary. Further, AOM 20 provides a sharp rectangular pulse, and the combination of aperture 38b and three lenses 38a, 38c, 40 that transfers the clipped beam at aperture 38b to sheet material 16 provides a sharp spatial edge. According to certain embodiments, it is desirable to have one or both components. However, neither is necessary. As described herein, for example, a slow rise time pulse from CW laser 18 can be used in embodiments of the invention although it is less desirable.

At least one controller 44 is incorporated into the system of FIG. 3 to control various components, such as the gantry and AOM 20. Controller 44 can be a standard microcontroller that includes a central processing unit (CPU), random access memory (RAM), read only memory (ROM) and input/output ports receiving input signals and sending output signals needed to control the system and to perform certain process steps as described herein. The functions described herein are generally programming instructions stored in memory and are performed by the logic of the CPU. Of course, the controller that performs the functions described herein could be a microprocessor using external memory or could comprise a combination of such a microprocessor or microcontroller combined with other integrated logic circuits. Controller 44 is generally incorporated into or works with a personal computer with a screen and input devices, such as keyboards, for inputting commands for process control and for monitoring the process control.

According to teachings herein, the laser-material coupling can be improved by minimizing the part of the laser power that is used merely to heat up sheet material 16, resulting in deformation and/or discoloration of the material, by minimizing the incident beam 12 contacting ablation 14.

Figure 4A:
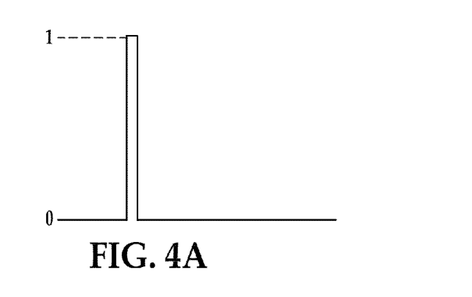
FIG. 4A is a temporal profile of a rectangular pulse generated by a laser.
Figure 4B:
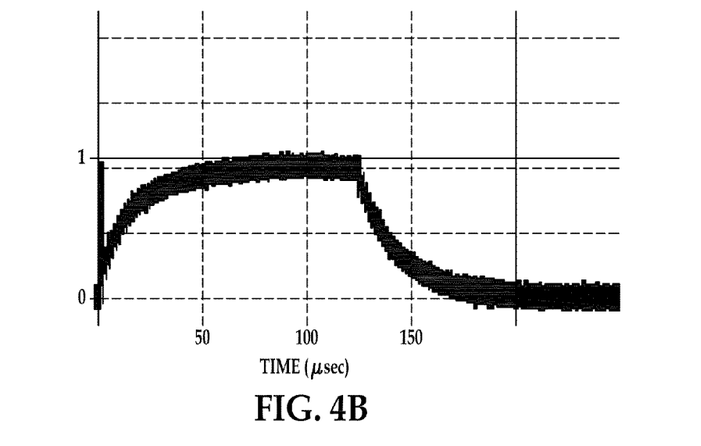
FIG. 4B is an enlarged oscilloscope output of a slow rise, or triangular, pulse generated by a Rf pumped pulsed CO2 laser.

FIG. 4A represents a so-called rectangular pulse having less than a 1 μsec rise time produced using the system according to FIG. 3. A rectangular pulse incorporates a relatively short rise time as compared to a so-called triangular pulse, which has a relatively long rise time such that the pulse takes longer to reach an elevated temperature to ablate the sheet material 16. An oscillograph output of such a slow rise time pulse is shown in FIG. 4B. As can be seen in FIG. 4B, the pulse rise time is approximately 300 μsec and the pulse width is close to 400 μsec (FWHM).

Heat equation (1) can be used to estimate the thermal dynamics of a material, that is, how quickly a material heats and cools over time based on application of a heat source, such as laser pulses:

$$\partial T/\partial t = k\nabla^2 T + \alpha * I(x,y,z) * V/c_p; \text{ wherein}$$

T(x, y, z, t) is the temperature of the material in space and time;

k is the heat diffusivity of the material;
α is the absorption coefficient of the material;
I(x, y, t) is the unreflected part of the incident irradiance;
V is the molar volume of the material;
$c_p$ is the heat capacity of the material; and $$kV^2T=\partial/\partial x(k\partial T/\partial x)+\partial/\partial y(k\partial T/\partial y)+\partial/\partial z(k\partial T/\partial z).$$

Figure 4C:
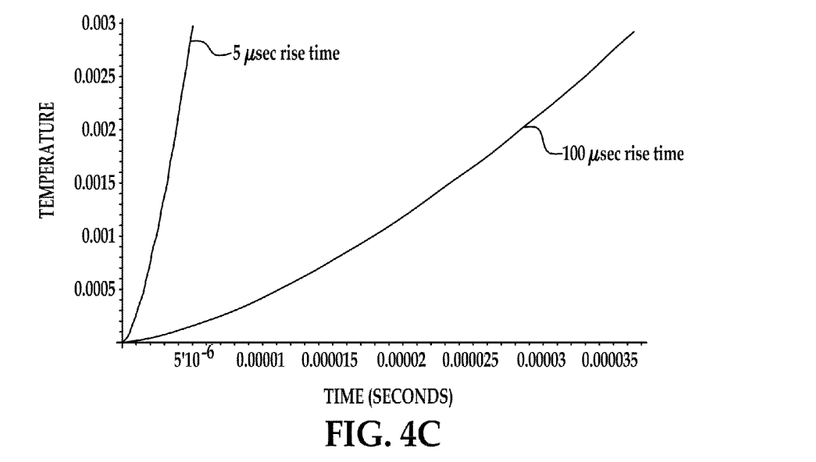
FIG. 4C is a graph comparing the temperature rise in a material for different laser pulses having two different temporal profiles.

FIG. 4C is a simulation performed using a modification of heat equation (1) to simulate the thermal dynamics with two different types of laser pulses. The shape of both pulses used is generally triangular with the same peak (1 per unit as shown in the example waveforms of FIGS. 4A and 4B), but they have different temporal profiles. One pulse has a 5 μsec rise time, while the other has a 100 μsec rise time. For the same material, the simulation shows a large difference in rise time will affect the efficiency of raising the temperature in the material and hence affect the efficiency of the ablation. As a result, sheet material 16 is loaded with internal heat that affects the wall and edge quality during the extended rise time.

Figure 5A:
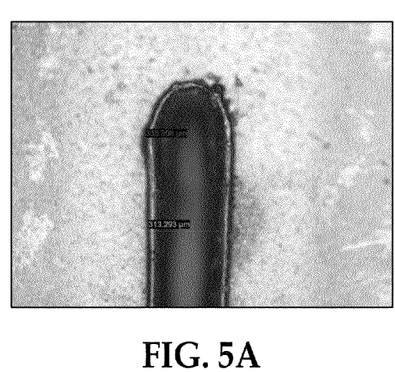
FIG. 5A is a magnified top view of a kerf processed with plural rectangular pulses.
Figure 5B:
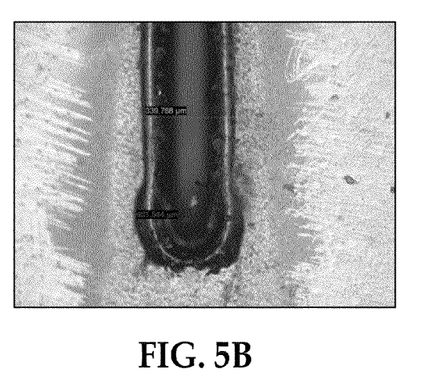
FIG. 5B is a magnified top view of a kerf processed by plural pulses with a slow rise time.
Figure 8:
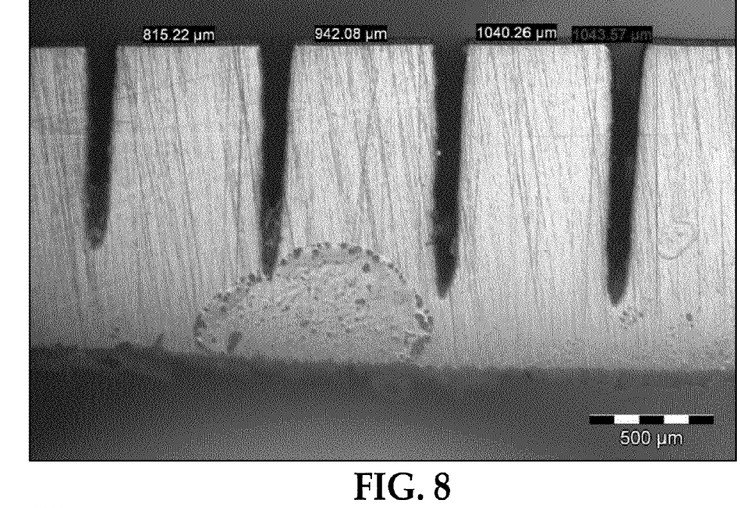
FIG. 8 is a magnified cross-sectional view of kerfs processed according to a varying number of laser routings in the first step according to FIG. 6A.

To verify the simulation, a plastic sheet was cut through using a CO2 laser with different temporal profiles, that is, a fast rise time pulse and a slow rise time pulse, and the results are shown in FIGS. 5A and 5B. FIG. 5A shows a kerf profile cut by CW laser 18 and AOM 20 (the fast rise time pulse), and FIG. 5B shows a kerf profile cut by an ordinary pulsed CO2 laser (the slow rise time pulse). The initial point of the cut in FIG. 5B shows more prominent thermal effect. That is, the kerf profile in FIG. 5A lasered using a rectangular pulse shows less thermal effect, e.g., discoloration and burning, than the kerf profile in FIG. 5B lasered using a pulse with a relatively slow rise time. This test confirmed the simulation. When the material removal rate saturates, the efficiency goes down. More laser power goes to heating plasma and adjacent material. The consequential effect is melting the kerf wall and/or enlarging the kerf and/or discoloring the top surface by delaminating the top coating. As can be seen in FIG. 5B, the triangular pulse also results in a larger diameter kerf. When a wall with small taper is required, it is desirable to avoid the generation of the plasma-induced burning. Such a thermal effect is shown in FIG. 8 in the edge of the kerf after eleven routings, as described hereinafter. Embodiments of the invention more desirably use a fast rise time pulse (e.g., a rectangular pulse) because it is easier to avoid such generation, and the examples shown herein use such a pulse. However, slower rise time pulses can also be used.

Figure 6A:
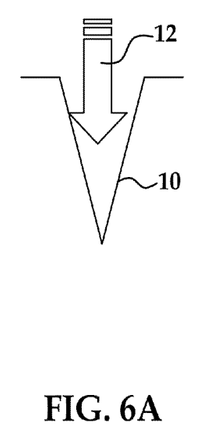
FIG. 6A is a simplified schematic view of the cross-section of a kerf cut in a first step of a two-step process according to one embodiment of the invention.

One process according to the invention is described in additional detail with respect to FIGS. 6A-6C, 7A and 7B. Broadly, the process comprises at least two steps. The first step is to remove material using the laser performing a number of routings according to a first toolpath (generally stored as a toolpath file for implementation by controller 44, for example). The first step is preferably performed in the linear region of material removal, that is, where additional routings using the first toolpath continue to remove material without evidence of saturation. Stated another way, the linear portion means the input power is linearly used for material removal. When the slope decreases (as shown in, for example, FIG. 1), the efficiency of material removal goes down. However, in some situations, particularly where the linear region is small and/or the required depth of kerf 10 is deep, the first step may continue into the saturation region. This is particularly true where the requirements of the finished edge are such that there is some flexibility in its appearance. FIG. 6A shows incident beam 12 of a laser forming kerf 10 during the first step according to a plurality of routings. Most of the material is typically removed in the first step.

Figure 6B:
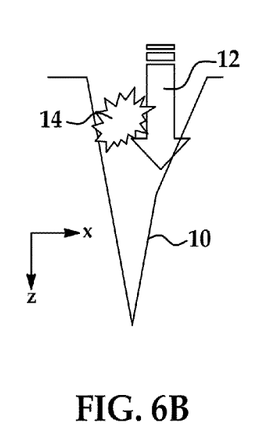
FIG. 6B is a simplified schematic view of the cross-section of a kerf cut in a second step of a two-step process according to one embodiment of the invention.
Figure 6C:
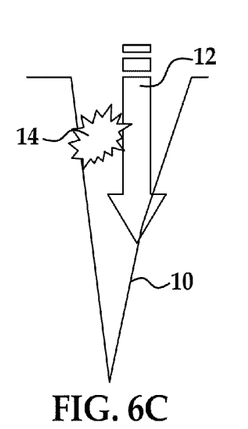
FIG. 6C is a simplified schematic view of the cross-section of a kerf cut in a second step of the two-step process according to another embodiment of the invention.

A second or later step involves performing at least one additional routing using a second toolpath with a transverse shift from the first toolpath, that is, a transverse shift from a trace (here, kerf 10 shown in FIG. 6A) generated by the first step. Of course, the invention is not limited to a second step and can include additional steps with further adjustments to the x-axis, z-axis or both. FIG. 6B shows kerf 10 of FIG. 6A during a second step with such a transverse shift. This second step allows the laser, such as CW laser 18, to couple better with the material because less of incident beam 12 is absorbed and/or deflected by plasma (ablated material) 14. That is, saturation of the ablation can be minimized as the laser beam path is not directed to the plasma 14. FIG. 6B shows an alternative second step that includes both a transverse shift (also called an x-axis shift) and a z-axis shift as discussed previously with respect to FIG. 2B. According to this embodiment, the second step also improves taper to remove materials near the bottom of kerf 10 and improve wall quality. Due to the better coupling of the material and the laser (specifically, incident beam 12) in the routings of the second step versus continuing to apply routings according to the first toolpath, thermal effect is minimized.

Figure 7A:
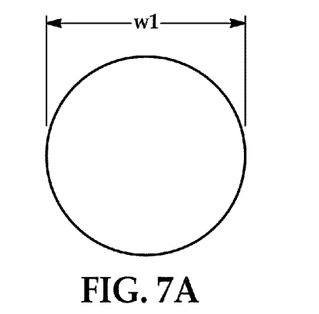
FIG. 7A is a simplified plan view of the laser routing in the first step according to FIG. 6A.
Figure 7B:
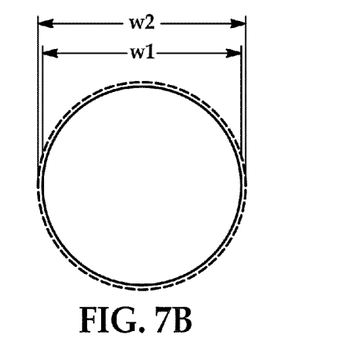
FIG. 7B is a simplified plan view of the laser routing in the second step according to FIG. 6B or FIG. 6C.

The transverse or x-axis shift is more clearly described with reference to FIGS. 7A and 7B. The first step ablates some material before the process becomes saturated, if possible, and provides a kerf width w1 of a specified dimension smaller than a desired kerf width w2. For example, the first toolpath applies a plurality of routings to form a circle as shown in FIG. 7A. Then, the second step applies one or more routings of a second toolpath with some shift in the transverse (x-axis) direction as shown in FIG. 7B. For the second step, the z height can also be adjusted for deeper cut as described with respect to FIG. 6C. In this manner, the second step provides a kerf 10 of the desired kerf width w2 as shown by the dotted line and can be associated with a z-axis shift as well.

As shown in FIGS. 7A and 7B, the cut is a circular cut resulting in a circular kerf 10. However, the invention is applicable with other cuts, including cuts with linear segments. The second toolpath in any case incorporates a transverse shift relative to the center of the kerf or trace generated by the first step. If the application is a cut out, and the quality of the piece removed (such as the circular piece in FIG. 7A) is not important, the first step can be a relatively aggressive cut as known by those in the field as long as it does not leave much thermal effect after the second step. In this way, the second step can be applied with optimal parameters for a minimal thermal effect while producing a clean edge for the opening.

As mentioned, the number of routings in the first step is most preferably performed in the linear region of material removal. This linear region depends on the heat affected zone of the material. With the extent of the heat affected zone known, x- and/or z-shifts are undertaken to extend the linear region, defining multiple toolpath files with appropriate transverse shifts. Details of these steps are best explained with reference to FIGS. 8 and 9.

Figure 9:
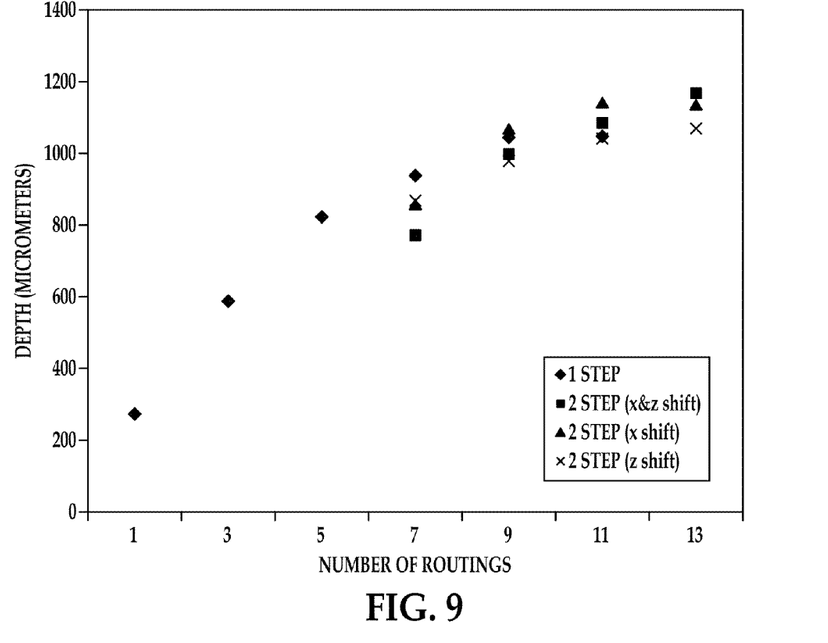
FIG. 9 is a graph showing the ablation versus the number of routings of various process methods as described with respect to FIGS. 6A-6C, 7A and 7B.

In the example of FIGS. 8 and 9, sheet material 16 is about 1 mm thick plastic (polycarbonate) with a 30 μm-thick brittle coating. It is desired that the edge after laser processing be sharp. In a single routing, the heat affected zone is proportional to the square root of the pulse width. That is, the diffusion length or heat affected zone can be roughly estimated by equation (2):

$$2*\sqrt{k*T_p};\text{ wherein}$$

k is the thermal (heat) diffusivity; and
$T_p$ is the pulse width.

Due to this relationship, it is preferable to use short pulses, but the material removal rate increases with pulse energy, which is the product of the pulse width and peak height. In order to limit variables for this test, the peak height was fixed. As a result, the pulse width is the variable to adjust for thermal effect and throughput. Even when time is included between first step routings that gives the material time to cool down and when adjusting repetition rate, etc., the material removal rate saturates as the number of routings increases, presumably due to the confinement of plasma inside the trench that absorbs much of the incident beam.

While equation (2) roughly estimates the heat affected zone in one routing, the accuracy of this estimate rapidly decreases with the number of routings. The heat affected zone is outside the kerf where the thermal effect, but not ablation, takes place. Etching depth can be estimated as the inverse of the absorption coefficient of the material. Given the etching depth, an empirical equation based on an experiment such as that shown in FIG. 1 can be used to predict the linear region.

Alternatively, heat equation (1) can be modified to estimate the thermal dynamics of the material in space and time when more than one routing is performed and so can be used to estimate the heat affected zone.

As described herein, defining the heat affected zone and determining the first and second number of routings, along with the transverse and/or z-axis (or z-height) shift, were done experimentally. Given a desired kerf profile and sheet material 16 comprising about 1 mm thick plastic (polycarbonate) with a 30 µm-thick brittle coating, methods of selecting the pulse characteristics were conventionally applied. This resulted in experimental conditions using a 50 KHz laser with a 5.1 µsec long pulse with a routing speed of 150 mm/s. Aperture 38 had a diameter of 500 µm to clip the beam by 20% in power, and the resulting pulse had a 95% duty cycle at 25 KHz.

The number of routings in the first step was performed and measurements of depth were made at routing numbers 1, 3, 5, 7, 9 and 11 in order to determine when the rate of material removal saturates. As shown in FIG. 8, saturation started after five (5) routings. Here, the number of routings chosen for the first step was five (5) routings. It is not necessary to pick a number of routings in the linear region, but it is preferable where a clean edge is desired and the material has a wider linear region. Depending on the requirements for the edge quality, one can choose a larger number of routings. How much shift along the x-axis for the second step can be determined by the edge quality such as taper and throughput. If the shift is too small compared with kerf width, further penetration into the material in a linear fashion may not result. Without being bound by theory, this is because the generated plasma 14 does not have enough space to expand (escape) to mitigate the coupling between it and incident beam 12.

Here, the amount of shift was determined experimentally. The amount of the shift in the z-height (that is, the z-axis direction) might depend on the material, but the goal is to find the optimal amount of shift in order to extend the removal rate in a linear fashion past the point where the one step process would so as to remove additional material while minimizing damage. The first and subsequent routings spatially overlap each other.

FIG. 9 shows the ablation versus the number of routings in various process methods. The one-step process just increases the number of routings without changing any parameters for the first toolpath. The second step incorporates a transverse shift (x shift) and/or a z-height change. As can be seen in FIG. 9, the two-step process with transverse and z-height adjustment as a second step improves the ablation process as additional depth of the cut can be achieved with a reduced thermal effect. In FIG. 9, the total number of routings is the sum of the routings in the first and second steps where the first step comprises five (5) routings. The x-axis shift was 50 µm, while the z-height moved from the top surface to 700 µm below the top surface.

Embodiments of the invention maximize the coupling between the laser and material by adding a second step including a transverse and/or y-axis shift. This obtains a wall with minimal taper and a sharp kerf edge. The wall also displays minimal thermal effect such as excessive melting and discoloring. As a result, removal of material during processing is optimized.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of cutting a sheet material using a laser, comprising:
performing a first cutting process of cutting the sheet material along a first toolpath a plurality of times in a row by:
cutting the sheet material along the first toolpath to form a cut extending below a top surface of the sheet material and having a single kerf formed in the surface of the sheet material along the first toolpath; and
cutting the sheet material at least one additional time along the first toolpath after forming the cut to deepen the cut along the first toolpath until the cut reaches a first depth below the top surface of the sheet material, each cutting along the first toolpath after forming the cut extending the cut deeper into the sheet material along the first toolpath than a previous cutting; and
performing a second cutting process of cutting the sheet material, at least one time, along a second toolpath after performing the first cutting process, the second toolpath spaced apart from the first toolpath in a direction along the top surface of the sheet material, thereby extending a width of the single kerf by an additional amount along the second toolpath and extending the cut by the additional amount along the second toolpath to at least the first depth.

2. The process of claim 1 wherein the laser is a CO2 laser.

3. The process of claim 1 wherein a pulse of the laser is a rectangular pulse having a rise time of less than 1 microsecond.

4. The process of claim 1 wherein the second toolpath includes a z-height shift from the first toolpath.

5. The process of claim 1 wherein performing the second cutting process comprises cutting the sheet material a plurality of times along the second toolpath after performing the first cutting process.

6. The process of claim 1 wherein performing the first cutting process occurs in a linear region of material removal by the laser, the linear region of material removal by the laser being a condition whereby the laser removes approximately a same amount of sheet material during each time of the plurality of times.

7. The process of claim 1 wherein performing the first cutting process and performing the second cutting process cuts through the sheet material from the top surface to an opposing surface.

8. The process of claim 1 wherein
each time of the plurality of times in the row of cutting the sheet material along the first toolpath removes approximately a same amount of the sheet material.

9. The process of claim 1 wherein performing the second cutting process extends the cut through a surface of the sheet material opposite from the top surface.

10. The process of claim 1, further comprising:
determining a linear region of material removal by experimentation by:
laser drilling a plurality of kerfs in a material sample, each of the plurality of kerfs formed to a respective achieved depth using a respective number of cuts; and
determining a sample kerf of the plurality of kerfs where, as the respective number of cuts increases, the respective achieved depth does not increase according to an approximately linear relationship; and
selecting a number of times for the plurality of times as a number of cuts equal to or less than the respective number of cuts used to form the sample kerf.

11. A method of cutting a sheet material using a laser, comprising:
performing a first cutting process of cutting the sheet material along a first toolpath a plurality of times in a row by:
cutting the sheet material along the first toolpath to form a cut extending below a top surface of the sheet material and having a single kerf formed in the surface of the sheet material along the first toolpath; and
cutting the sheet material at least one additional time subsequent to forming the single kerf along the first toolpath to deepen the cut along the first toolpath; and
performing a second cutting process of cutting the sheet material, at least one time, along a second toolpath after performing the first cutting process, the second toolpath spaced apart from the first toolpath and extending a width of the single kerf; wherein each cut of the first cutting process removes approximately a same amount of material from the sheet material.

12. The process of claim 11, further comprising:
determining a number of times for the plurality of times of the first cutting process.

13. The process of claim 12 wherein determining the number of times comprises:
determining when each cut of the first cutting process removes approximately the same amount of material by experimentation; and
selecting the number of times based on the experimentation.

14. The process of claim 12 wherein determining the number of times comprises:
performing at least three cuts using the first toolpath on a sample of the sheet material including:
performing a first cut along the first toolpath to form a single cut in the sample extending below a top surface of the sample and having a single kerf formed in the surface of the sample along the first toolpath;
performing a second cut along the first toolpath to deepen the single cut in the sample; and
performing at least a third cut along the first toolpath to deepen the single cut in the sample; and
selecting one of the at least three cuts as the number of times.

15. The process of claim 11 wherein the second toolpath includes a z-height shift from the first toolpath.

16. The process of claim 11 wherein performing the first cutting process and performing the second cutting process cuts through the sheet material from the top surface to an opposing surface.

17. The process of claim 11 wherein the second toolpath is shifted from the first toolpath in a direction along the top surface of the sheet material such that the second toolpath is adjacent to and in parallel with the first toolpath.

* * * * *